United States Patent [19]
Benway

[11] Patent Number: 5,807,033
[45] Date of Patent: Sep. 15, 1998

[54] DRILLING JIG

[76] Inventor: Randy E. Benway, 810 Rice St., Horicon, Wis. 53032

[21] Appl. No.: 677,442

[22] Filed: Jul. 2, 1996

[51] Int. Cl.$^6$ .............................. B23B 35/00; B23B 47/28
[52] U.S. Cl. ......................... 408/1 R; 144/346; 144/353; 408/103; 408/115 R
[58] Field of Search ................................... 408/72 B, 97, 408/103, 115 R, 115 B, 241 B, 1 R; 144/344, 345, 346, 353, 355, 372, 83, 144.1; 156/250, 256, 258

[56] References Cited

U.S. PATENT DOCUMENTS

| | | |
|---|---|---|
| 62,491 | 2/1867 | Isenberg . |
| 310,710 | 1/1885 | Nichols . |
| 550,767 | 12/1895 | Thielscher ................................ 408/97 |
| 1,032,933 | 7/1912 | O'Brien . |
| 1,432,485 | 10/1922 | Moller . |
| 1,762,457 | 6/1930 | Uhrin ...................................... 408/103 |
| 2,029,650 | 2/1936 | Betz . |
| 2,268,930 | 1/1942 | Edwards ................................. 408/103 |
| 2,804,788 | 9/1957 | Humphrey ............................. 408/103 |
| 2,811,878 | 11/1957 | Morgan . |
| 2,934,979 | 5/1960 | Hartje .................................... 408/103 |
| 3,211,026 | 10/1965 | Calahan . |
| 3,807,889 | 4/1974 | Kiezel . |
| 4,093,394 | 6/1978 | Adams ................................... 408/103 |
| 4,137,003 | 1/1979 | Budoff . |
| 4,153,384 | 5/1979 | Isaken . |
| 4,194,861 | 3/1980 | Keller ................................. 408/241 B |
| 4,474,514 | 10/1984 | Jensen . |
| 5,174,693 | 12/1992 | Lee et al. . |
| 5,281,058 | 1/1994 | Hill . |
| 5,318,082 | 6/1994 | Von Hollen . |

FOREIGN PATENT DOCUMENTS

| | | |
|---|---|---|
| 91683 | 3/1923 | Germany . |
| 1314809 | 4/1973 | United Kingdom . |
| 2203069 | 10/1988 | United Kingdom . |
| 2238749 | 6/1991 | United Kingdom . |

OTHER PUBLICATIONS

"Loose–Tenon Joinery" article from Fine Woodworking pp. 46–48, Jan./Feb. 1993;.
"Choosing the Strongest Joinery for Doors" article from Fine Woodworking, pp. 58–61, Mar./Apr. 1995;.
Page from "Woodshop News" Sep. 1995.
3 pages from catalog.

*Primary Examiner*—Daniel W. Howell
*Attorney, Agent, or Firm*—Wheeler Kromholz & Manion

[57] ABSTRACT

The present invention is an improved loose tenon joint with multiple arculate mortise surfaces and similarly configured loose tenon member for woodworking applications. A jig is provided arranged to be secured to a workpiece where the jig axially guides a drill bit for boring a series of adjoining holes forming a mortise. The first jig embodiment manipulates a slidable guide bar maintaining longitudinally spaced drill guide holes and two index holes. A hand held drill is used to bore a series of holes (fixtured by the drill guide holes) into the workpiece. A second series of holes are bored (completing the mortise) after the drill guide is translated and secured to the second index hole. A second embodiment is provided including a stationary jig body arranged to be secured to a workpiece. An elongated opening in the jig body supports a drill guide with longitudinally spaced drill guide holes. A hand held drill is used to bore a series of holes (fixtured by the drill guide holes) into the workpiece. The first drill guide is replaced by a second drill guide with preset hole spacing where a second series of holes are bored, completing the mortise. Both embodiments provide multiple guide holes for fast drilling with full drill bit contact area and preset hole spacing to produce a uniform and accurate mortise for a strong loose tenon joint system.

9 Claims, 5 Drawing Sheets

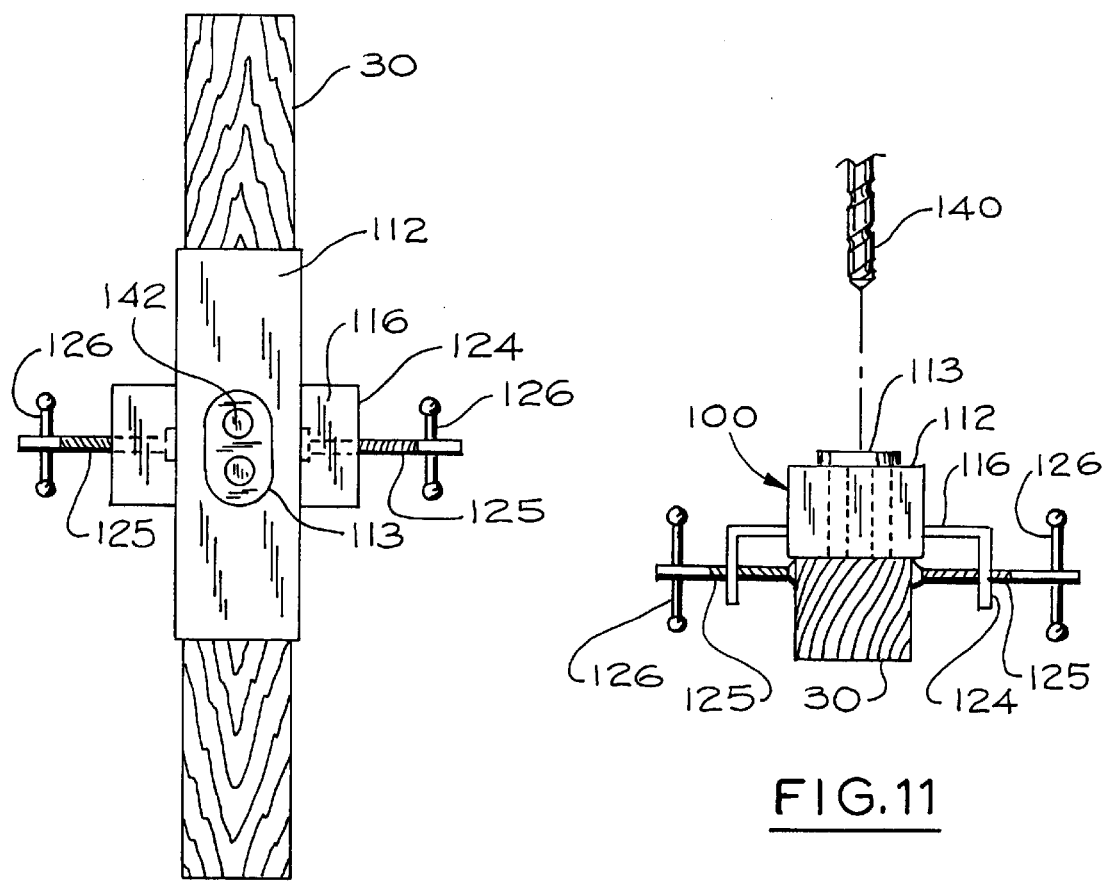
FIG. 10
FIG. 11
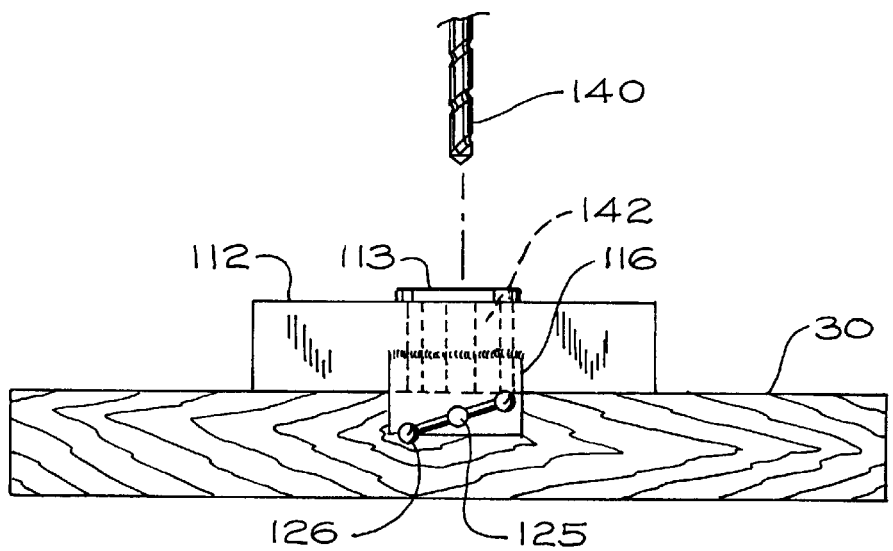
FIG. 12

DRILLING JIG

BACKGROUND OF THE INVENTION

The present invention relates generally to woodworking joints and drilling jigs used to produce them. More particularly, this invention relates to loose tenon joints and drilling jigs used to drill a mortise. In a loose tenon joint, both pieces of stock to be joined are mortised (slotted) and a section of precut tenon is inserted into the mortises securing the two members.

Articles appearing in "Fine Woodworking" magazine of March/April 1995, (pages 58–61) and January/February 1993 (pages 46–48) provide background of various mortise and tenon options, including loose tenon joinery. Some typical applications using loose tenon joints are doors, windows and cabinet casework. In general, a loose tenon joint is comprised of two wood members with similar sized mortises formed in each piece. An independent loose tenon member (matching the size of the mortises) is captured by the two mortises securing the joint. Conventional mortises have parallel planar surfaces with either square or rounded corners. Tenon stock can be purchased or prepared by the woodworker. Typically made in strips to match the mortise, loose tenons are cut from the strips as needed; a simple hand saw can be used. Loose tenon joints are strong because of the large tenon section through the joint and generous side-grain gluing surface needed for long life.

Many devices have been made for producing mortises in wood. The devices fall into three general categories: hand tools, machine tools, and drilling jigs. Mortising chisels have been used by craftsmen for decades to hand cut mortises for joinery and hardware. A mortising chisel is a heavy bladed tool designed to be struck with a mallet. The process is slow and requires skill to perform accurately.

Machine tools such as the hollow chisel mortiser and chain mortiser greatly speed the cutting process. The hollow chisel mortiser plunges a drill bit surrounded by a square hollow chisel into the wood producing a square hole; indexing the workpiece with each stroke of the chisel produces the mortise. The chain mortiser, suited to production work, manipulates a miniature chain saw chain and bar into the wood producing the mortise with a single pass. These tools are costly and are not designed to mortise into the ends of long or bulky workpieces as loose tenon joinery often requires. Router based machine tools have become the common method for cutting mortises for loose tenon joints. They can be used by either manipulating the tool along a jig affixed to the workpiece or mounting the router to a machine with a movable table. The stock is clamped to the table and the workpiece guided into the router tooling. Both methods produce a milled mortise with rounded corners; tenon stock is then prepared with corresponding round corners. The process is dirty and very noisy. In addition, the milled mortise is limited in depth by the length of router tools available. Also, manipulating the router (or wood if a stationary router is used) is difficult on long or large pieces.

Various drill guide jigs have been available for boring wood. Although most jigs guide a single drill for the purpose of producing a doweled joint, some jigs are designed to allow boring of a series of adjacent, overlapping holes. These jigs are intended to hog material prior to hand chiseling. Installing deep mortise door locks is a typical application.

The objective of the present invention is to produce an improved loose tenon joint with deeper multiple arcuate mortise surfaces for increased side grain gluing surface. The present invention provides for a low cost jig enabling the woodworker to easily produce accurate, deep mortises for the joint (even on long or bulky workpieces) using only a pistol drill. Additionally, the present invention contemplates the provision of router and/or shaper tooling to produce the tenon material on these conventional machine tools.

As previously described, various forms of loose tenon joinery exist in prior art. None of these variations allow for added side grain glue surface by incorporating the multiple arcuate surfaces described by the present invention, nor do they mortise in a single operation using only a pistol drill. Prior art router based tools are limited in mortise depth by the length of the router bit. In addition, accurately milling the end of a long workpiece is difficult using router tools. This invention uses a conventional drill bit to accurately produce a loose tenon joint of greater depth, increasing side grain glue surface, while the material is stationary. Prior art hollow chisel and chain mortisers do not have capacity to mortise the ends of long lengths commonly needed in loose tenon joinery.

Other wood boring drill jigs exist in prior art. One of the earliest concepts was illustrated in U.S. Pat. No. 62491 granted J. Isenberg on 26 Feb. 1867. The tool provided a series of laterally spaced guide holes for receiving and supporting drill bits. U.S. Pat. No. 310,710 (Nichols) also provided a bit for guiding drilled openings with particular application for boring doors for locks. Again, U.S. Pat. No. 1,432,485 (Moller) illustrated a jig usable in assisting the drilling of a mortise for insertion of a door lock. This jig merely provided a gauge to ensure alignment of several drilled openings to be later chiseled to produce a square-cornered mortise. U.S. Pat. No. 3,211,026 (Calahan) discloses a jig body with multiple crescent shaped guide holes used to guide a drill bit for fast material removal prior to hand chiseling. This design does not provide the full drill bit guide contact of the present invention for improved hole orientation. Goggins jig, UK Patent 1,314,809 maintains full drill bit contact but requires that the user correctly set spacing between each drilled hole; this is inaccurate and slow. The present invention provides full drill bit contact area and preset hole spacing for maximum accuracy. In addition, other hole sizes and spacing, can be easily substituted. Gumbrell UK Patent Application, discloses a jig with a movable guide bar. The guide bar has a drilled bit guide hole and index holes (pinned through the jig body) that control drilled hole spacing. Gumbrell does not disclose the simple construction of the present invention, nor does it allow for fast drilling with multiple guide holes.

Additionally, the Gumbrell device does not lead the user through the correct drilling sequence; the drill will "walk" if a hole is attempted next to a previously drilled hole. The present invention solves the problem encountered in the prior art, while simplifying the structure and performing more functions. The inventor is not aware of any prior art structure that teaches or discloses the invention disclosed and claimed herein.

SUMMARY OF THE INVENTION

In accordance with the present invention, a novel and useful drilling jig is herein described.

The drilling jig of the present invention has particular application in configuring each of facing mortises formed in abutting members arranged for receiving an independent, loose tenon member. The jig is capable of providing the usual pre-formed bored and chiseled apertures defining conventional square-cornered mortises. Conventional mortises are formed by means of either a square four-sided mortise chisel surrounding a rotating drill bit, or are pre-drilled to remove most of the material, the remaining surfaces being trimmed flat by simply using a carpenter's maul and a hand-held chisel.

The improved jig includes a jig body for longitudinally supporting a slidable guide bar with predetermined indexing holes for use in incrementally positioning multiple guide bar drill holes over a workpiece member to provide a mortise therein. The axis of the drill holes are preferably normal to the plane coextensive with the axis of the respective indexing holes. The jig further includes a removable, transversely positioned indexing pin which is slidably received by the respective indexing holes in the slidable guide bar to ensure pre-aligned indexed drilling positions. Thus, the indexed guide bar indexing holes will permit superior and secure positioning of the pre-spaced drill guide holes to produce a uniform and accurate mortise ensuring a strong loose tenon joint.

Accordingly, the device and method disclosed herein may generally be defined as: A drilling jig comprising a stationary body having an indexing aperture, a drill guide bar arranged for slidable engagement with respect to the body. The guide bar including a series of longitudinally spaced thru-bores for receiving and axially guiding a drill bit and at least two longitudinally spaced indexing holes lying in a longitudinal plane angularly relative to the axis of said thru-bores, and a removable indexing pin arranged for insertion and withdrawal into and out of respective indexing holes in said guide bar and said indexing aperture or said stationary supporting body.

The drilling jig wherein the supporting body may be of general U-shape defining at least one upstanding side wall including the indexing aperture and being slidably engageable with the guide bar.

The drilling jig wherein the axial plane of the thru-bore may be substantially perpendicular to the longitudinally plane of the guide bar indexing holes.

The drilling jig wherein the supporting body may also include clamping members extending laterally from opposite sides of the body and including releasable clamping means arranged to engage with and be supported by a workpiece to be drilled by the drill bit.

The drilling jig wherein the guide bar indexing holes may be longitudinally spaced from one another to temporarily retain the drill-receiving thru-bores in axially spaced position for drilling a mortise in a workpiece, the mortise having oppositely disposed surfaces configured to define a series of adjoining, slightly overlapping arc-shaped undulations.

The drilling jig wherein the preset drill guide holes and indexing holes may be longitudinally spaced to provide a series of adjacent drilled mortise borings having equally spaced radii in approximate tangentially engaging relationship.

The drilling jig wherein the clamping members may be secured to supporting side walls of the supporting body and including inverted depending surfaces each having a threaded hole for receiving a threaded shaft and means for turning the shaft to and from engagement with the workpiece.

Alternatively, and perhaps preferably, the drilling jig of the present invention may be described as comprising a stationary body having an aperture, a minimum of two drill guide structures arranged for engagement with said aperture with respect to said body. The guide structures including at least two one aperture for receiving and axially guiding a drill bit. In this embodiment the drilling jig may further be of a design wherein the stationary body is of general rectangular shape defining at least one upstanding side wall and being engageable with said guide structure. Further, the drilling jig may also be of such a design wherein the stationary body includes clamping members extending laterally from opposite sides of said body and including releasable clamping means arranged to engage with and be supported by a workpiece to be drilled by the drill bit. Also, the drilling jig of the present invention may be of such design, wherein the clamping members are secured to supporting side walls of the stationary body and including inverted depending surfaces each having a threaded hole for receiving a threaded shaft and means for turning the shaft to and from engagement with the workpiece.

Additionally, the present invention may be described as a method of providing a loose tenon fastening system for joining a pair of abutting members. The method comprising forming a mortise in each of the members by drilling a series of equally spaced bores lying in a longitudinal plane and being spaced to provide a series of arc-shaped, undulating, oppositely disposed mortise surfaces and forming a loose, independent tenon member having opposite surfaces configured substantially identical to the undulating surfaces of the mortises, and inserting a portion of the tenon in a respective mortise and securing the tenon and mortise together.

The method wherein the securing step comprises the application of adhesive to the tenon and the respective mortises.

The method wherein the adjoining, arc-shaped undulations may have radii in slight overlapping relationship with respect to one another.

Consequently, it is a general object of the present invention to provide a jig used to form the respective mortises in mating pieces of a loose tenon joint for woodworking applications.

It is another object of the present invention to provide a jig with multiple guide holes for faster mortising, increased drilling accuracy, by maintaining full drill bit contact area and preset drill spacing.

It is a further object of the present invention to provide a jig which allows relatively deep mortises to be drilled, thereby increasing the gluing surface and strength of the joint.

A still further object of the present invention to provide a jig which may be operable with a conventional hand-held drill and inserted drill bit and which jig is portable to facilitate use on large and/or immobile pieces.

The above and further objects, details and advantages of the present invention, will be readily available from the detailed description and drawings to follow.

DESCRIPTION OF THE DRAWINGS

FIG. 10 is a top plan view of the jig as disclosed in the view of FIG. 1;

FIG. 11 is an end elevational view of the jig and supporting workpiece of FIG. 8 and 10, and positioned below and in axial alignment with a drill bit;

FIG. 12 is a side elevational view of the jig of FIG. 8 position on a workpiece.

DETAILED DESCRIPTION

Figure 1:
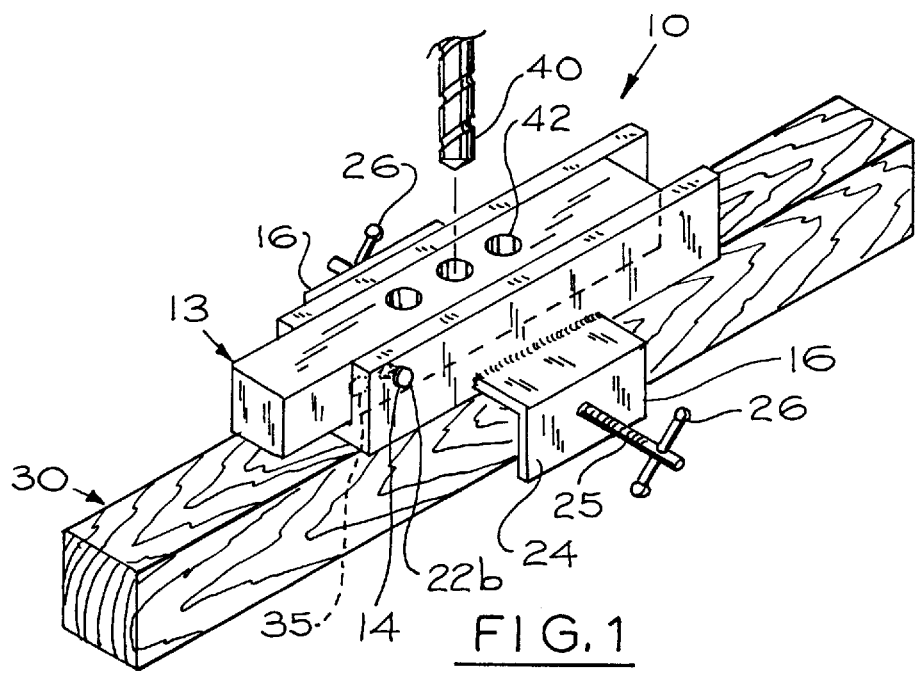
FIG. 1 is a perspective view of the improved jig shown secured to a wooden workpiece by means of oppositely disposed clamping devices.

Although the disclosure herein is detailed and exact to enable those skilled in the art to practice the invention, the physical embodiments herein disclosed merely exemplify the invention which may be embodied in other specific structure. While the preferred embodiment has been described, the details may be changed without departing from the invention, as defined by the claims.

With reference to FIGS. 1–6 inclusive, the improved jig of the present invention is designated generally by the reference numeral 10. The cooperating elements of the jig 10, as particularly shown in the exploded view of FIG. 2, comprises a generally U-shaped body, or stationary support member 12, a slidable guide bar 13 and an indexing pin 14. The U-shaped body 12 is provided with oppositely disposed clamps 16 formed integrally with and extending laterally from respective sidewalls 18 of the generally U-shaped supporting body 12. The upstanding sidewalls 18 are joined by a base or floor 20. Both of the sidewalls 18 include axially aligned apertures 22a and 22b arranged to receive a removable indexing pin 14. The stationary body 12, as previously mentioned, is provided with laterally extending, inverted L-shaped clamps 16 each preferably welded to a respective sidewall 18 of the body 12. The clamps 16 include downwardly (with respect to FIGS. 1 and 2) depending clamping wall surfaces 24. The wall surfaces 24 each have a threaded aperture for receiving a threaded clamping screw 25 arranged for clamping engagement with a workpiece 30 by means of a manually operable handle 26.

Figure 2:
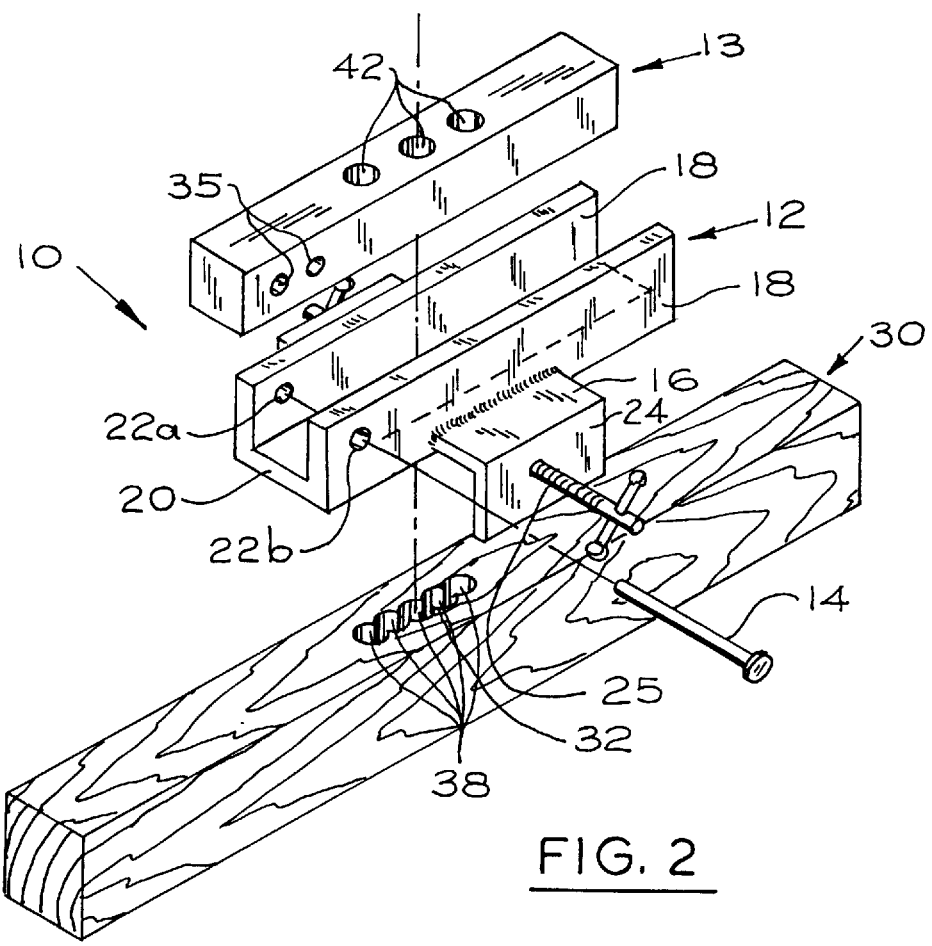
FIG. 2 is an exploded, perspective view illustrating overlapping pre-drilled mortise holes in a workpiece, and the improved jig elements being illustrated in alignment therewith.
Figure 3:
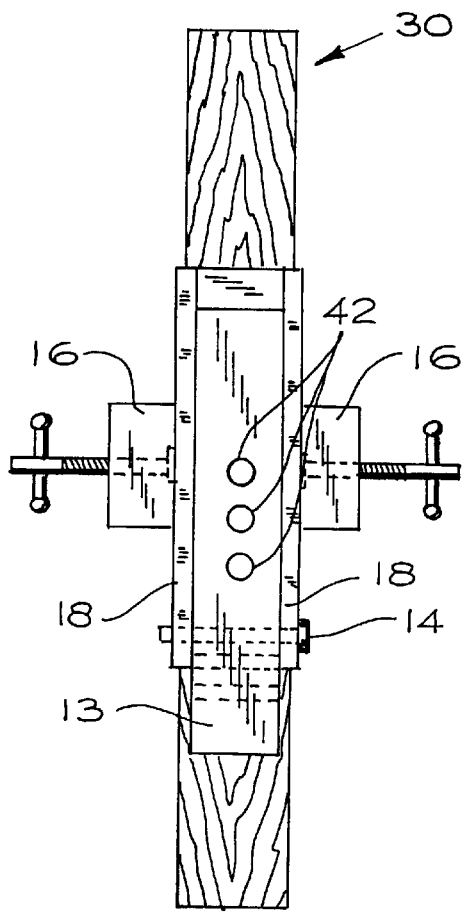
FIG. 3 is a top plan view of the jig and disclosed in the view of FIG. 1.
Figure 4:
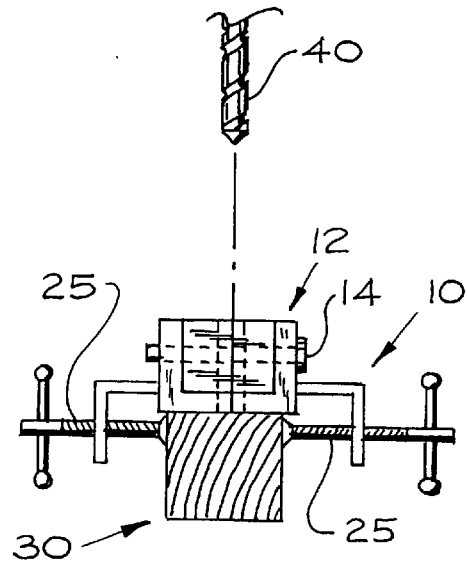
FIG. 4 is an end elevational view of the jig and supporting workpiece of FIG. 1 and 3, and positioned below and in axial alignment with a drill bit.
Figure 5:
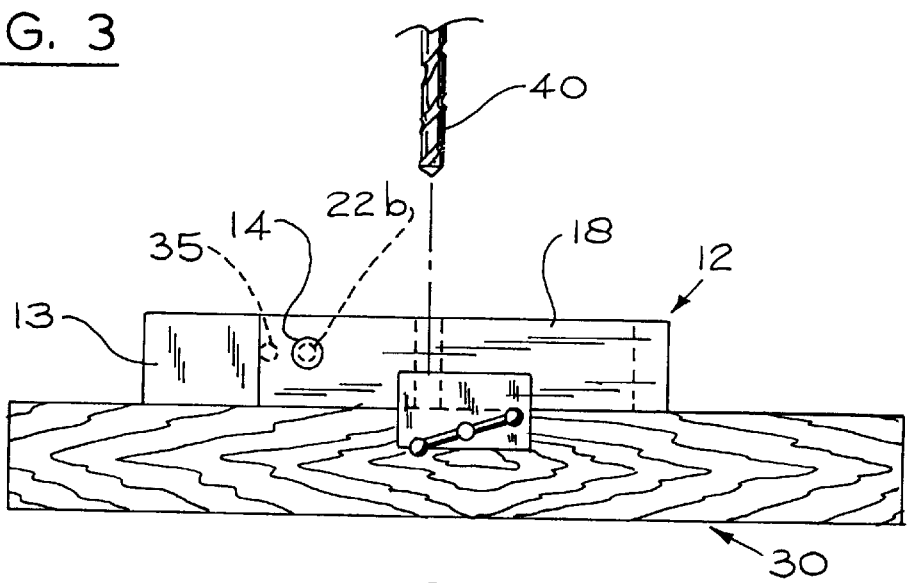
FIG. 5 is a side elevational view of the jig of FIG. 1 positioned on a workpiece and particularly illustrating the slidable guide bar indexing holes and removable indexing pin positioned in one of several indexing holes.
Figure 6:
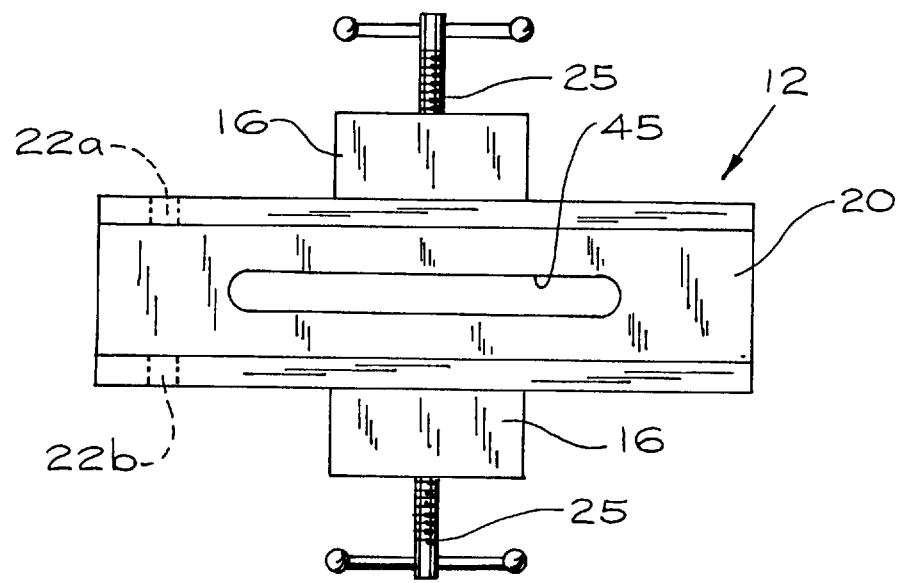
FIG. 6 is a top plan view of the jig base or stationary support member with the guide bar removed to particularly illustrate an elongated longitudinal slot formed in the bottom surface of the support member.

With reference to FIG. 2, the jig 10 is positioned with respect to the workpiece 30 at a preselected area defining the mortise 32, which will hereinafter be more specifically described. In order to provide the preferred configuration of the mortise 32, there is provided the slidable guide bar 13 having a series of longitudinally spaced drill guide holes 42 and coplanar indexing holes 35. Although two holes 35 are shown in the first embodiment, there may be provided more holes 35 provided along the length of the guide bar 13. The guide bar 13 rests on the floor 20 of the U-shaped body 12 and is arranged for longitudinal movement in either direction, to provide a means of selectively aligning the respective indexing holes 35 with the apertures 22a and 22b of the body sidewalls 18. Desired longitudinal spacing of the holes 35 is assured by means of insertion of the pin 14 through the aperture 22b, a respective indexing hole 35 and into the aperture 22a. With reference to FIGS. 1, 2 and 5, it will be noted that a drill bit 40 is inserted into the drill guide holes 42 of the guide block 13 where the first series of mortising holes are bored. The drill bit 40 may be conveniently used with a hand-held drill (not shown) which permits facile movement to each of the pre-spaced boring holes 42. A second series of bored holes complete the mortise and are established by longitudinally moving the guide bar 13 with respect to the stationary body 12 after removal of the pin 14 from a first position with respect to a preselected indexing hole 35, and thereafter repositioning the pin 14 in the next adjacent indexing hole 35 of the guide bar 13. Depth of the mortise 32 may be established by means of a conventional drill stop (not shown) inserted on the drill bit 40. Attention is next directed to the top plan view of FIG. 6, wherein an elongated, longitudinal slot 45 is formed in the floor 20 of the body 12 to accommodate movement of the slidable guide bar 13 to any of its several indexing positions without obstruction of the floor 20 with respect to the drill bit 40. The drill bit 40 passes through the slot 45 into the pre-clamped workpiece for forming the mortise 32.

It is preferred to provide the arrangements of openings and holes in the guide bar 13 and the sidewalls 18, as shown in the views of FIGS. 1–6, wherein the axis of the drill bit 40 is maintained by the drill guide holes 42 with respect to the desired configuration of the resultant mortise 53 of the workpiece 30. That is, the axis of the drill bit 40 and the guide holes 42 is preferably normal or perpendicular to the plane passing through the axes of the indexing holes 35 of the guide bar 13.

Figure 7:
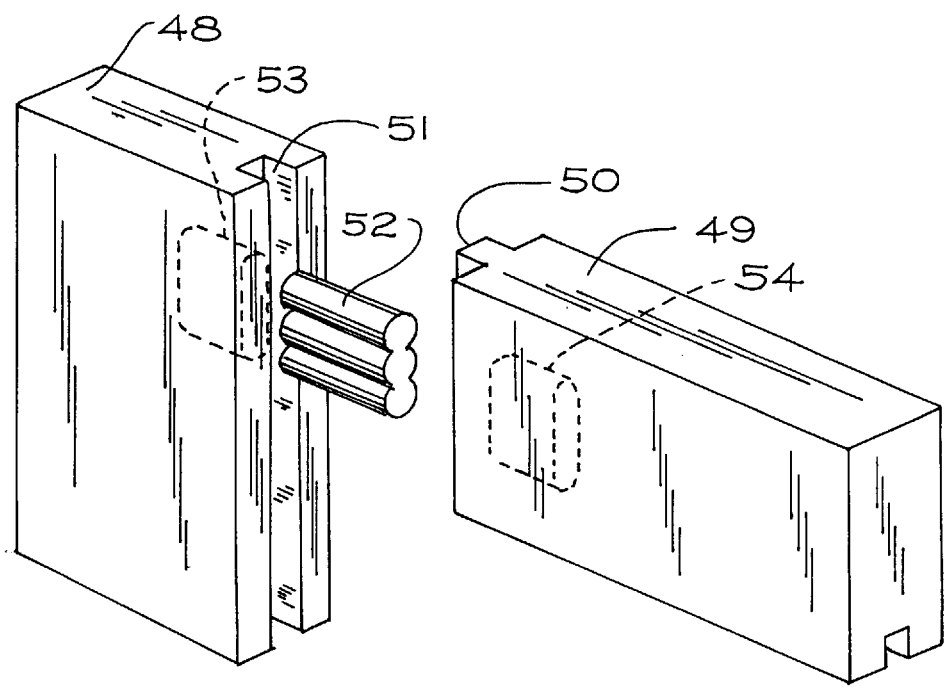
FIG. 7 is a perspective. exploded view illustrating a loose tenon-mortise system for joining two abutting members.

As will be apparent from the perspective, exploded view of FIG. 7, the loose tenon joinery system finds particular adaptation to the joining of rails and stiles that make up a wood door or window frame. As shown in FIG. 7, the usual abutting stile 48 and rail 49 have a tongue 50 and mating groove 51 utilizing an independent milled, loose tenon 52 arranged with portions being respectively seated in mortises 53 and 54 of the stile 48 and rail 49. The mortises 53 and 54, and tenon 52 may be formed to any desired depth and length, which may be readily accommodated by simply sawing off a preformed loose tenon 52 from its milled preformed (not shown). As is conventional practice, glue or other adhesive is applied to the surfaces of the mortises 53 and 54 and the tenon 52, with the system being held in glue clamps (not shown) for the appropriate time for setting the adhesive or glue.

It will be further apparent that the present invention has provided an improved drilling jig for configuring mortises of abutting wooden members to conform substantially with the configuration of a loose tenon member, both in the workshop or in the field, and thereby provide a versatile and facile assembly of the parts to be joined and secured together.

With reference to FIGS. 8–12 inclusive, a second embodiment of the improved jig of the present invention is designated generally by the reference numeral 100. The cooperating elements of the jig 100, as particularly shown in the exploded view of FIG. 9, comprises a generally rectangular-shaped body, or stationary support member 112 having oppositely disposed clamping members 116 formed integrally with and extending laterally from respective sidewalls 118 of the generally rectangular-shaped supporting body 112. The stationary body 112, as previously mentioned, is provided with laterally extending, inverted L-shaped clamping members 116 each preferably welded to a respective sidewall 118 of the body 112. The clamping members 116 include downwardly depending clamping wall surfaces 124. The wall surfaces 124 each have a threaded aperture for receiving a threaded clamping screw 125 arranged for clamping engagement with a workpiece 30 by means of a manually operable handle 126.

Figure 9:
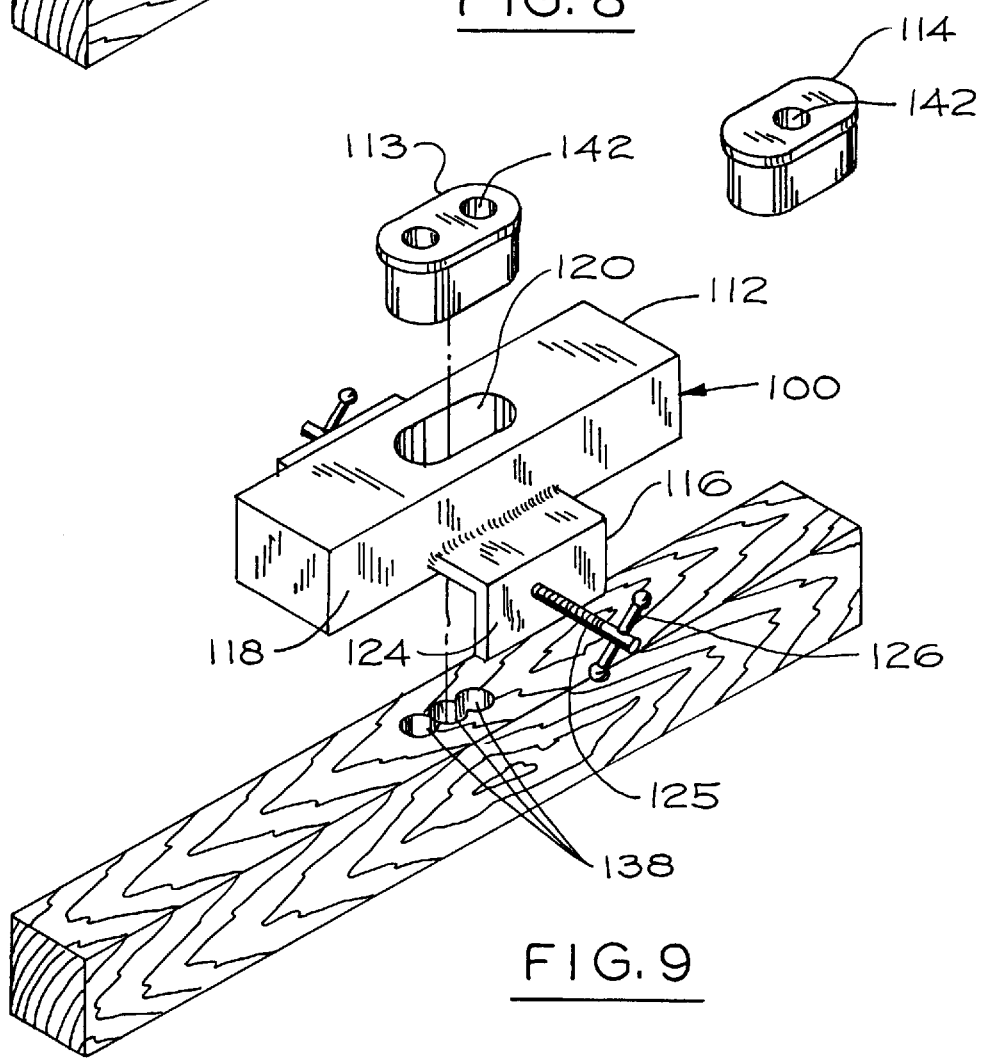
FIG. 9 is an exploded, perspective view illustrating overlapping pre-drilled mortise holes in a workpiece, an improved jig element being illustrated in alignment therewith.

With reference to FIG. 9, the jig 100 is positioned with respect to the workpiece 30 at a preselected area defining the mortise 138. In order to provide the preferred configuration of the mortise 138, there is provided an elongated opening or slot 120 formed within the body 112. The slot 120 is sized to removably receive a first drilling guide 113 and a second drilling guide 114. Each drilling guide 113 and 114 has at least one longitudinally spaced co-planar indexing bushing or aperture 142. Although two bushings 142 are shown in first drilling guide 113 and one bushing 142 are shown in second guide 114 for purposes of illustration, there may be provided more bushings 142 along the length of each drilling guide 113 and 114. Each drilling guide 113 and 114 fits securely within elongated opening or aperture 120.

Figure 8:
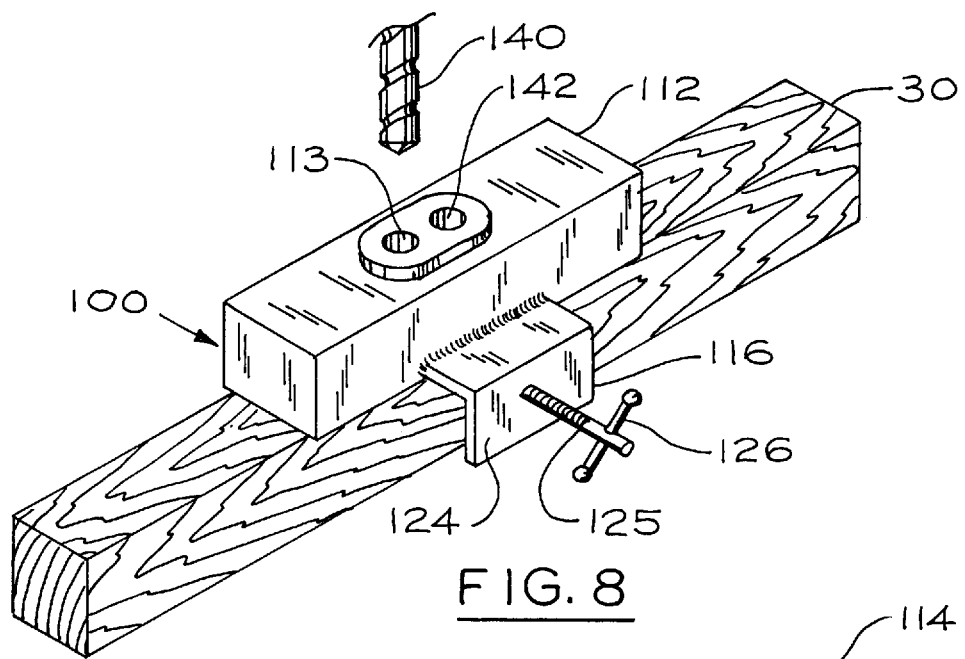
FIG. 8 is a perspective view of a second embodiment of the improved jig shown secured to a wooden workpiece by means of oppositely disposed clamping devices.

With reference to FIGS. 8 and 11, it will be noted that a drill bit 140 is inserted into the drilling guide 113 or 114 positioned within the jig body 112. The drill bit 140 may be conveniently used with a hand held drill (not shown) which permits movement to each of the several boring positions. After the drill bit 140 has been passed through the first inserted drilling guide 113 and the preset apertures have been formed within workpiece 30, the first drilling guide is removed and the second drilling guide 114 is installed in elongated opening or slot 120. The drill bit 40 is then used to form the additional overlapping apertures within workpiece 30 to complete the mortise.

Depth of the mortise 32 may be established by means of a conventional drill stop (not shown) inserted on the drill bit 140. It is preferred to provide the arrangements of openings and holes in each drilling guide 113 and 114 as shown in the views of FIGS. 8–12, wherein the axis of the drill bit 140 is maintained by the drill guide hole 142 with respect to the desired configuration of the resultant mortise 138 of the workpiece 30. That is, the axis of the drill bit 140 is preferably normal or perpendicular to the plane passing through the axes of the bushings 142 of each drilling guide 113 and 114.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is hereinafter defined by the claims.

What is claimed is:

1. A method of providing a loose tenon fastening system for joining a pair of abutting members, said method comprising forming a mortise in each of said members by drilling a series of equally spaced bores lying in a longitudinal plane and, being spaced to provide a series of arc-shaped, undulating, oppositely disposed mortise surfaces, forming a loose, independent tenon member having opposite surfaces configured substantially identical to the undulating surfaces of said mortises, inserting a portion of said tenon in a respective mortise and securing said tenon and mortise together.

2. A drilling jig comprising a stationary body having at least one upstanding sidewall including an indexing aperture, a drill guide structure arranged for sidable engagement with respect to said stationary body, said drill guide structure including a thru-bore for receiving and axially guiding a drill bit, a series of longitudinally spaced indexing holes disposed in said guide structure and lying in a longitudinal plane angularly relative to the axis of said thru-bore, and a removable indexing pin arranged for insertion and withdrawl into and out of respective indexing holes in said guide structure and said indexing aperture in said stationary supporting body.

3. The drilling jig of claim 2, wherein the axis of said thru-bore is substantially perpendicular to the longitudinal plane defined by the axes of said guide bar structure indexing holes.

4. The drilling jig of claim 2, wherein said stationary body includes clamping members extending laterally from opposite sides of said body and including releasable clamping means arranged to engage with and be supported by a workpiece drilled by said drill bit.

5. The drilling jig of claim 2, wherein the stationary body is a general U shape with upstanding parallel sidewalls, each of said sidewalls including axially aligned indexing apertures.

6. The drilling jig of claim 3, wherein said drill guide structure includes a plurality of longitudinally spaced thru-bores having their respective axes lying in a plane substantially perpendicular to the plane defined by the axes of said indexing holes, whereby said jig will provide a guidance means for drilling a series of adjacent mortise borings having equally spaced radii in approximate tangenially engaging relationship.

7. The drilling jig of claim 4, wherein said clamping members are secured to supporting side walls of said stationary body and including inverted depending surfaces each having a threaded hole for receiving a threaded shaft and means for turning said shaft to and from engagement with said workpiece.

8. The method of claim 1, wherein the adjoining, arc-shaped undulations have radii in slight overlapping relationship with respect to one another.

9. The method of claim 1, wherein the securing step comprises the application of adhesive to said tenon and said respective mortises.

* * * * *